SAND CLASSIFIER WITH BLENDING SYSTEM

Filed Aug. 7, 1967 6 Sheets-Sheet 1

Inventor
F. C. Archer
By Lieber & Nilles
Attorneys

SAND CLASSIFIER WITH BLENDING SYSTEM
Filed Aug. 7, 1967 6 Sheets-Sheet 2
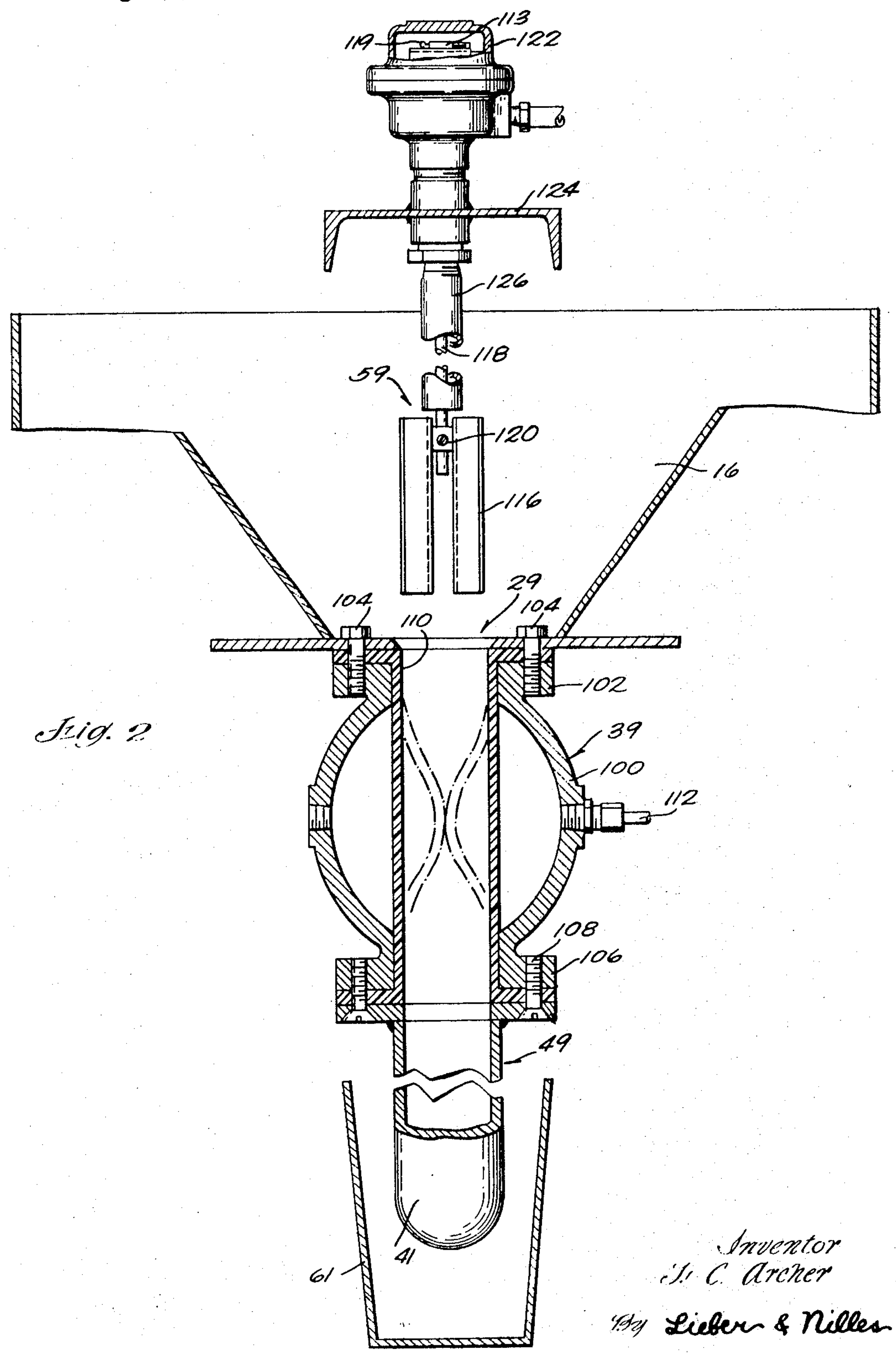
Inventor
F. C. Archer
By Lieber & Nilles
Attorneys SAND CLASSIFIER WITH BLENDING SYSTEM
Filed Aug. 7, 1967 6 Sheets-Sheet 3
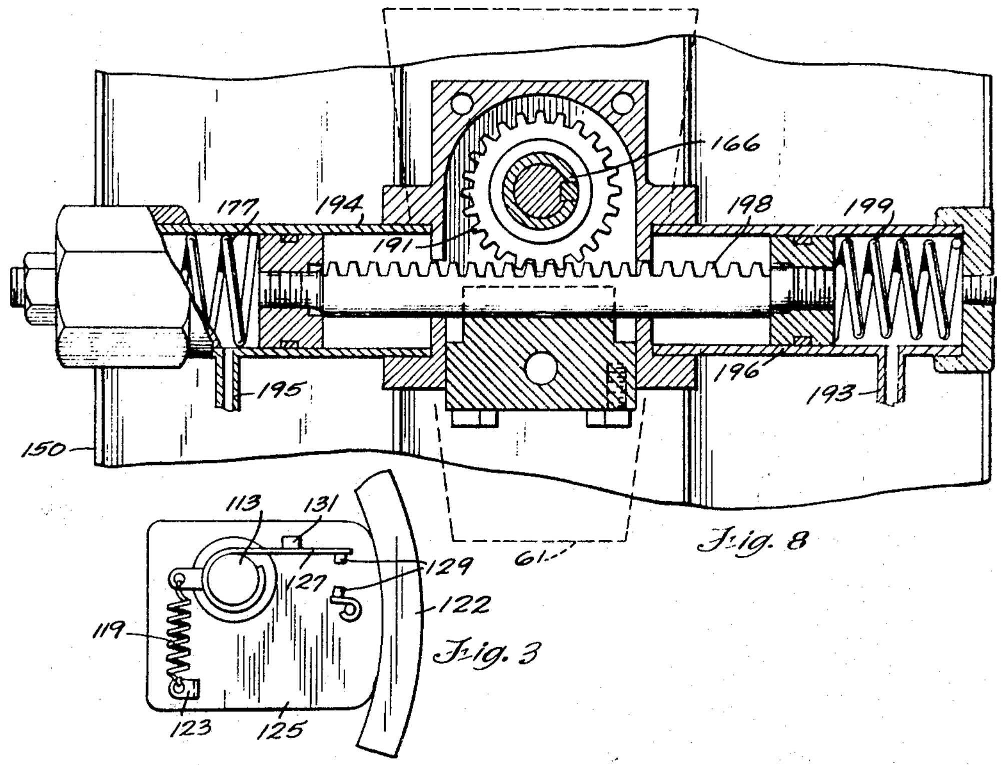
Fig. 8
Fig. 3
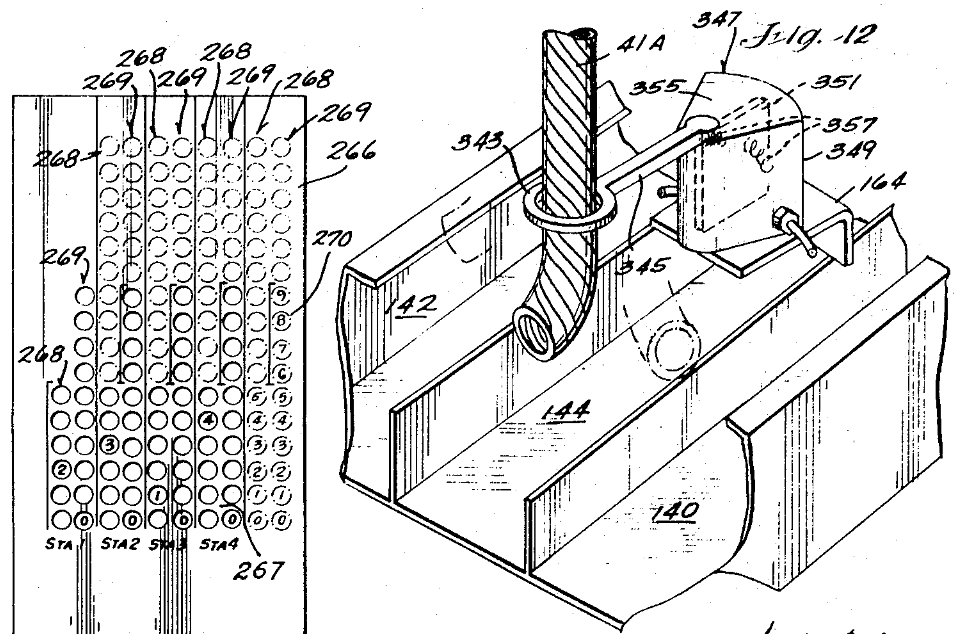
Fig. 12
Fig. 11
Inventor
F. C. Archer
By Lieber & Nilles
Attorneys SAND CLASSIFIER WITH BLENDING SYSTEM
Filed Aug. 7, 1967
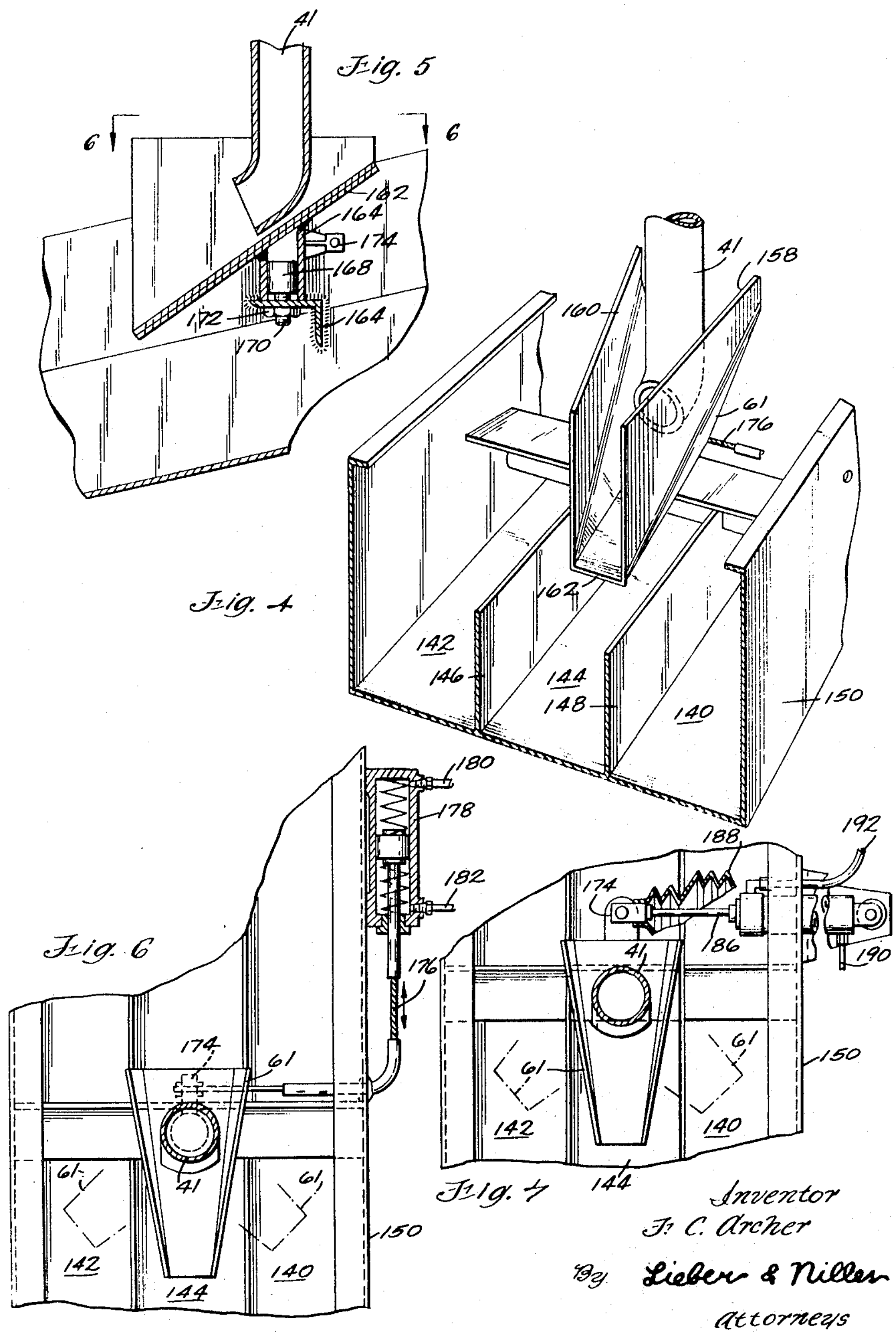
Inventor
F. C. Archer
By Lieber & Nilles
Attorneys SAND CLASSIFIER WITH BLENDING SYSTEM
Filed Aug. 7, 1967 6 Sheets-Sheet 5
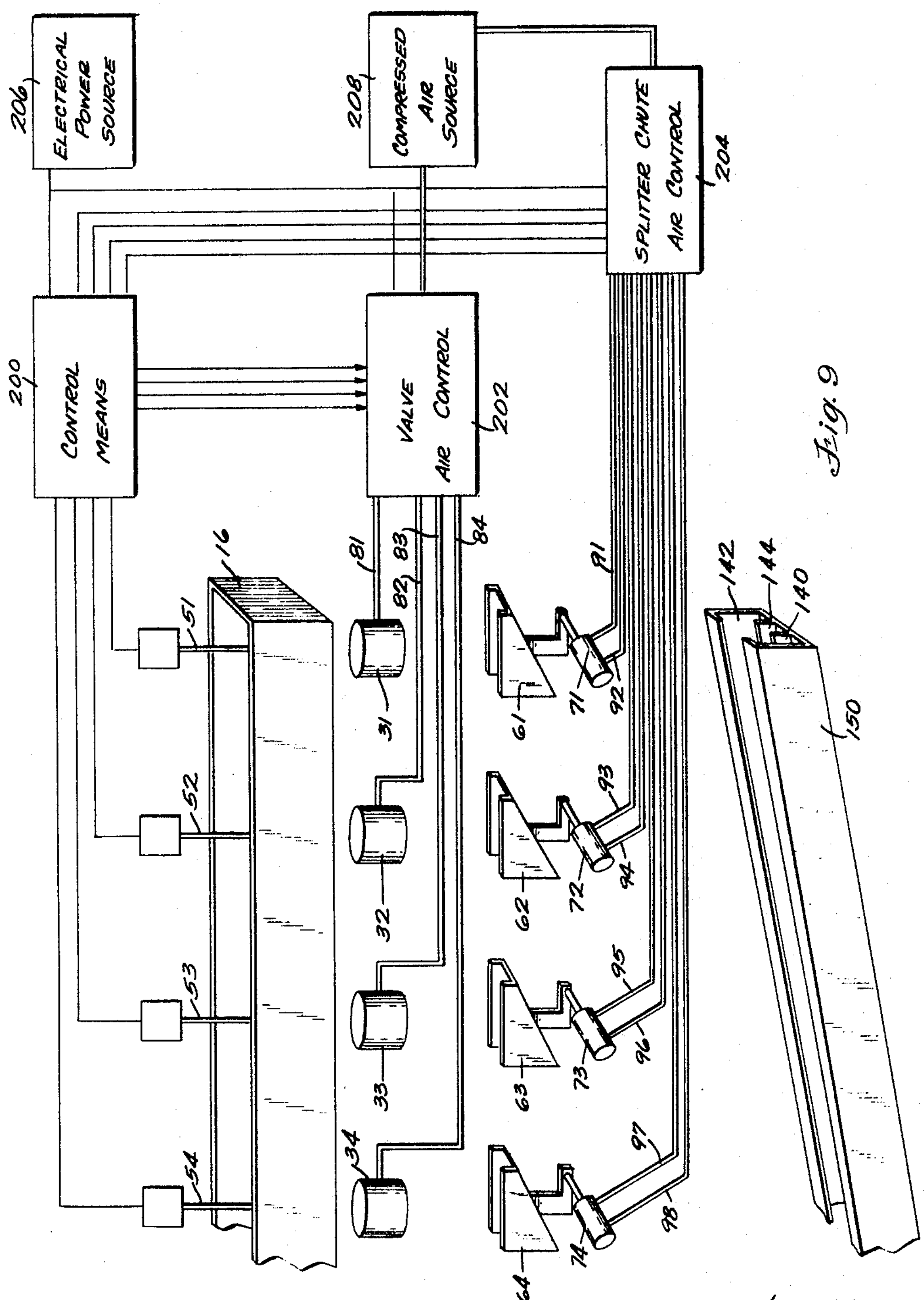
Inventor
F. C. Archer
By Lieber & Nilles
Attorneys

SAND CLASSIFIER WITH BLENDING SYSTEM

Filed Aug. 7, 1967 6 Sheets-Sheet 6

Inventor
F. C. Archer
By Lieber & Nilles
Attorneys

United States Patent Office 3,467,281

Patented Sept. 16, 1969

3,467,281

SAND CLASSIFIER WITH BLENDING SYSTEM

Fred Curtis Archer, Whitefish Bay, Wis., assignor to Barber-Greene Company, Aurora, Ill., a corporation of Delaware Filed Aug. 7, 1967, Ser. No. 658,798
Int. Cl. B03b *3/02*
U.S. Cl. 222—70 7 Claims

ABSTRACT OF THE DISCLOSURE

This invention relates to hydraulic sand classifiers, and relates more particularly to an improved system for reconstituting or blending classified sands into one or more sand products having a desired formulation and for controlling the formulation of the sand products at a plurality of classifying stations.

Background of the invention

A typical hydraulic sand classifier utilizes a settling tank for the classification of the sand or other water-insoluble granular material. A slurry of sand and water flows into one end of this elongated tank and a water overflow occurs at the opposite end and along the sides. The sand settles to the bottom as the slurry traverses the tank with the smaller size sand particles settling toward the overflow end of the tank. The settling tank thus serves to separate or classify the various particle size sands according to their position in the tank. While the classification of the sands thus obtained is not extremely precise in terms of uniformity, it is sufficient for commercial purposes and is obtained far more economically than similar classifications obtained mechanically or through other known means.

Once the sand has been classified according to particle size, it is generally desirable to immediately reconstitute, or blend, the various particle size sands into a desired formulation or product for delivery, for example, to a concrete plant or the like. To accomplish this, discharge valve means are installed at spaced intervals, called classifying stations, along the bottom of the tank so that each valve discharges a different gradation of sand particles. A control means is operatively associated with the discharge valve means to form a blending system for a hydraulic sand classifier. This control means controls the operation of the classifier to deliver given amounts of the different particle size sands to a common collecting means, such as a product flume, in accordance with the desired formula or blend for the sand product. The control means generally determines the amounts of the different particle sizes delivered to the product flume by controlling the length of time the various discharge valves deposit sand into the flume. Thus, if twice as much of a certain particle size is required than of another, the valve means discharging the greater desired amount is operated by the control means to deposit sand in the product flume for twice the period of time the valve means discharging the lesser desired amount deposits sand in the product flume. Excess sand not required for the blending of the sand product is deposited in a surplus product flume and conducted to a surplue sand pile. Since the blending system regulates the disposition of the sand from the settling tank it forms an essential part of a hydraulic sand classifier.

It is also often desired to prepare additional sand products having varying formulations with the sands remaining in the tank after the first sand product has been blended. This reduces the amount of sand deposited in the surplus flume. In the preparation of a plurality of sand products or differing formulations, the blending system becomes even more important.

Blending systems of prior art hydraulic sand classifiers have generally employed a plurality of discharge valves at each of the classification stations in the water settling tank. A valve for each sand product being formulated is provided plus a valve for surplus sand. This cluster of valves at each station results in a complicated mechanical structure, not only for the valves, but also for the associated control apparatus.

Further, in prior systems of this type, the complexity of the valve mechanism has required that the actuating apparatus for the valves be located on top of the settling tank. Long valve stems extending through the water and accumulated sand in the tank are employed to operate the valves. These valve stems are subject to corrosion and rust due to their exposure to the water and to abrasion due to the sand. The valve stems create turbulence in the water interfering with the proper settling of the sand. In addition, the length of these valve stems may cause misalignment to occur between the actuating mechanism and the valve itself resulting in faulty operation of the valve. Adjustment mechanisms with turnbuckles, lock nuts, or the like are required to insure that the valve stems are of the proper length to both open and close the valves. It is difficult to determine which valve or valves is actually discharging sand without a close inspection of the valves, stems, and actuating mechanisms.

The control means employed with the above described discharge valve arrangement has also been rendered unduly complicated due to the necessity of controlling the plurality of valves. This results in an attendant increase in manufacturing and maintenance costs.

Summary of the invention

A primary object of the present invention is, therefore, to provide an improved blending system for use with a hydraulic sand classifier for reconstituting or blending the classified sand into one or more sand products of desired formulation.

Yet another object of the present invention is to provide an improved blending system for use with a hydraulic sand classifier which formulates a plurality of sand products on a sequential basis by preparing first one sand product and then additional sand products in series to thereby most efficiently use the classified sand in the hydraulic sand classifier.

A further object of the present invention is to provide an improved blending system for use with a hydraulic sand classifier which formulates a plurality of sand products on a sequential basis, but which gives preferential treatment to the first product produced in said sequence to thereby permit the production of a large quantity of one sand product of a desired formulation without the necessity of producing similar amounts of sand products of other formulations.

An additional object of the present invention is to provide a hydraulic sand classifier blending system including only a single discharge valve means at each classifying station and a control means operatively associated with the discharge valve means to produce one or more sand products blended to desired formulations.

Briefly, the present invention provides a blending system for controlling the formulation of sand products from a hydraulic sand classifier having a plurality of sand classifying stations each having a single valve means providing a sand discharge. A distributing means associated with each of the valve means is adjustable among a plurality of product flumes to deposit the discharge from the valve means into the flumes. A control means for controlling the adjustment of the distributing means is provided in the blending system to regulate the amount of each of the given size sands deposited in the product flumes, and hence the formulation of the products.

Brief description of the drawings

The blending system of the present invention may be more fully understood by reference to the following specification and drawings, forming a part thereof, in which:

FIGURE 2 is a transverse cross sectional view of the hydraulic sand classifier shown in FIGURE 1, taken along the irregular line 2—2- of FIGURE 1, and showing in detail the means for indicating a sufficiency of sand at the classifying stations of the tank and the discharge valve means located at each of the classifying stations;

FIGURE 3 is a detailed plan view of a portion of the sensing means used to indicate a sufficiency of sand at the classifying stations;

FIGURE 4 is a part sectional fragmentary perspective view of the product flumes of the hydraulic sand classifier and the distributing means associated with each of the discharge valve means of the settling tank;

FIGURE 5 is a central vertical section through one of the discharge valves and associated distributor which are located at each of the classifying stations of the water settling tank;

FIGURE 6 is a fragmentary part sectional view taken generally along the line 6—6 of FIGURE 5 showing the distributing means and one embodiment of an actuating means therefor;

FIGURE 7 is a similar fragmentary view of the distributing means showing another embodiment of the actuating means therefor;

FIGURE 8 is a fragmentary, cross sectional plan view of the distributing means showing yet another embodiment of the means for operating the chute;

FIGURE 9 is a block diagram of the blending system for the hydraulic sand classifier showing only four of the classifying stations and certain elements of the classifier diagrammatically for the sake of clarity;

FIGURE 11 is a plan view of a punched card which may be employed with the blending system of the present invention; and FIGURE 12 is a perspective view of another embodiment of the distributing means associated with each of the discharge valves and the actuating means therefor.

Description of the preferred embodiment

Figure 1:
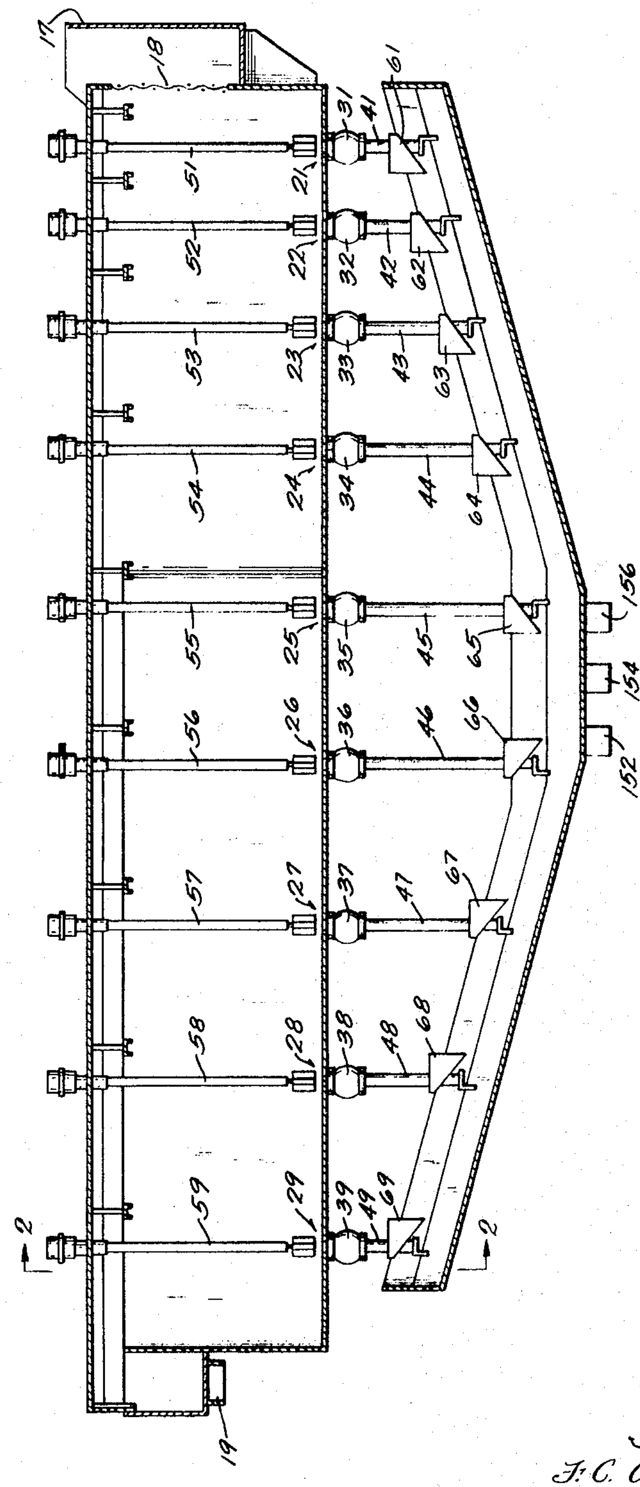
FIGURE 1 is a longitudinal cross sectional view of a hydraulic sand classifier showing the settling tank and product flumes forming portions of the classifier.

Referring particularly to FIGURES 1 and 2, there is shown therein the settling tank 16 of a hydraulic sand classifier. Tank 16 is generally rectangular and has an inlet conduit 17 at one end thereof which is supplied with a slurry of multiple particle size sand and water. A screen 18 provided between the inlet conduit 17 and the tank to prevent debris such as rocks, sticks, twigs, and other refuse from entering tank 16. The tank has an outlet conduit 19 at its opposite end through which excess water in the tank is drained off.

As the slurry of sand and water enters tank 16 through screen 18, the sand particles begin to settle out of the water onto the bottom of the tank. The heavier, larger sized particles settle at a rapid rate and come to rest almost immediately on the bottom of tank 16 near screen 18. Lighter, smaller particles settle at a slower rate and are carried by the water currents in the tank some distance down the length of the tank before finally settling out on the bottom of the tank. The lightest particles of sand remain in suspension in the water for the entire length of the tank and fall out of the water adjacent to the outlet conduit 19 or the sides of the tank.

A plurality of classifying stations 21 through 29 are positioned along the bottom of tank 16. The number of such classifying stations provided in the settling tank 16 is determined by the length of the tank. Commercial embodiments of hydraulic sand classifiers generally employ from four to twelve classifying stations. Thus, FIGURE 1 shows nine classifying stations in tank 16. FIGURE 2 shows further details of the classifying stations 21 through 29 as well as a transverse cross sectional view of tank 16. As may be seen, the tank is V-shaped in cross section to assist the sands in settling at the classifying stations.

A single opening is provided at each of the classifying stations 21 through 29, respectively, to permit the sand to be discharged from the classifying station through a discharge valve means. The discharge valve means includes a single valve 31 through 39 at each of the respective stations which discharges into spouts 41 through 49, respectively. As shown, the valves employed in the present instance are of a simple pneumatic sleeve type, and the use of a single such valve at each discharge station provides an economical and extremely simple means for each classifying station. From FIGURE 2 which shows, in detail, the simple classifying station 29, it is apparent that the valve 39 has a spheroidal valve body 100 formed with a flange 102 for mounting the valve body on the bottom of tank 16, as by bolts 104 and with a flange 106 mounting spout 49 as by bolts 108. Extending through the spheroidal body 100 is a resilient rubber sleeve 110 also secured by the bolts 104 and 108 through which the contents of tank 16 are discharged into spout 49. Valve 39 may be closed to thereby prevent the contents of tank 16 from passing through valve body 100 by supplying air pressure to the body 100 about resilient sleeve 110 through air line 112 to collapse the sleeve 110 as shown in phantom in FIGURE 2.

Tank 16 also includes a plurality of sand level sensors as indicators 51 through 59, one of which is located at each of the respective sand classifying stations 21 through 29 to determine when there is a sufficient level of sand in tank 16 to permit a blending operation to commence. Sand level indicators 51 through 59 may take the form of motor driven paddle wheels which apply a torque to a torque-sensing means when there is sufficient sand in tank 16. Such structure is also shown in FIGURE 2 from which it will be seen that each indicator has a paddle wheel 116 fastened to shaft 118 by set screw 120. Shaft 118 extends through the water in tank 16 and is coupled to and driven by motor 117 mounted in housing 122 on catwalk 124 on top of settling tank 16. Shaft 118 may be protected by a tubular shield 126 attached to the housing. Motor 117 is mounted in a housing 122 so as to be movable through a short arc in its mounting when the accumulation of sand in the bottom of tank 16 retards the motion of paddle wheel 116 to apply a torque to the motor.

As shown in FIGURE 3 an extension 113 of the motor 117 extends through plate 125 which is affixed to the inner wall of housing 122 so as to be stationary. The extension 113 has two arms 121 and 127 thereon, one of which contains a pair of switch contacts 129 while the other contains a hole for spring 119. The other end of spring 119 is inserted in lug 123 of plate 125. When no torque is applied to paddle wheel 116, the motor 117 is held in its initial position by a stop 131 which abuts arm 127 and by a tension spring 119 which moves the arm into abutment with the stop. Movement of the motor in response to the accumulation of sand in the tank 16 is detected by switch contacts 129 which close as arm 127 is rotated out of abutment with stop 131 against the tension provided by spring 119 by torque exerted on the motor. Closed contacts 129 provide an output signal to the remainder of the blending system indicating a sufficiency of sand at the classifying station.

It will be appreciated that other torque sensing means constructions may be employed. For example, motor 117 may be eccentrically mounted on the catwalk 124 so as to be movable in a cam-like manner by the torque applied to paddle wheel 116 to close the switch contacts.

Each discharge valve 31 through 39 has a distributing means operatively associated therewith. Such means is, in each instance, generally in the form of a splitter chute which operates to divide or split the discharge from its valve for distribution to a plurality of product flumes. These components of the hydraulic sand classifier may be most clearly seen in FIGURE 4 which shows a perspective view of sand classifying station 21 including spout 41, splitter chute 61 and product flumes 140, 142 and 144. Product flumes 140, 142 and 144 may be formed by divider walls 146 and 148 in trough 150 which has high sidewalls to prevent the contents of the product flumes from splashing out. Trough 150 containing the product flumes passes under each of the sand classifying stations 21 through 29, as shown in FIGURE 1, so that sand from each classifying station may be discharged into any selected one of the three product flumes.

Product flume 140 may be employed to receive and carry away the first sand product blended or reconstituted from the various particle size sands discharged from water settling tank 16 and hence is termed the first product flume. Product flume 142 may like wise be used to receive and carry away the second such sand product blended and is termed the second product flume. Product flume 144 carries away the surplus and remaining after the formulation of blending of the two sand products. The material in each of the flumes 140 through 144 is drained from the hydraulic sand classifier through the flume outlets 152, 154 and 156 respectively.

The splitter chutes 61 through 69 may be formed of sheet metal or the like and receive sand from the lower end of the respective discharge spouts 41 through 59. As shown in FIGURE 4, the chute 61 is formed with a pair of sidewalls 158 and 160 and an inclined bottom 162 to guide the discharge from the spout 41 into the product flumes. Chute 61 is pivotally mounted on member 164 extending across trough 150 immediately above product flumes 140, 142 and 144. Specifically, the inclined bottom 162 of chute 61 contains a bracket 166 in which is fitted the outer-race of bearing 168. The inner race of the bearing is fitted on shaft 170 which is affixed to bracket 164 by nut 172. Bracket 166 also includes a link 174 which is used to adjust the position of splitter chute 61 on shaft 170 so that the discharge from spout 41 is deposited in the desired flume. FIGURES 4, 6 and 7 show the chute in a position to deposit the discharge from spout 41 into surplus flume 144 with the other positions shown in phantom lines. Since the position of the splitter chuts may be easily observed, a simple visual check of the operation of the blending system is thus provided.

Diverse types of actuating mechanisms may be employed to adjust the position of splitter chute 61 on shaft 170, and such mechanism may utilize mechanical, hydraulic, pneumatic, electric, or manual means. As an example, three pneumatically operated actuating mechanisms for providing movement of the chutes are shown in FIGURES 6, 7, and 8.

For example, pneumatic operation of the chutes provides a simple actuating means, and the spent air may be exhausted into the atmosphere thus eliminating the need for air return lines. Rapid actuation of the means and adjustment of the splitter chute is also provided pneumatically, particularly in cold weather. In the embodiment shown in FIGURE 6, one end of a shielded flexible cable 176 is fastened to link 174 on bracket 166 of the splitter chute. The other end is fastened to the piston of a spring centered pneumatic cylinder 178 mounted on the side of trough 150. The length of cable 176 is adjusted so that with the piston centered in air cylinder 178, splitter chute 61 is positioned to direct the discharge of spout 41 into surplus flume 144. This fixes the position of the splitter chute when air cylinder 178 is deenergized. If air is admitted into air cylinder 178 through inlet 180, cable 176 is extended to move splitter chute 61 in a counterclockwise direction, as viewed in FIGURE 6, to deposit the discharge of spout 41 into first product flume 140. If, on the other hand, air is admitted into air cylinder 178 through inlet 182, cable 176 is retracted to move splitter chute in a clockwise direction to deposit the discharge from spout 41 into second product flume 142.

The embodiment shown in FIGURE 7 also employs an air cylinder 71 mounted on trough 150 but the piston of air cylinder 71 is connected directly to link 174 through arm 186. Arm 186 is protected by an expandable shield 188. With the actuating mechanism shown in FIGURE 6, air cylinder 71 is de-energized and the splitter chute may, for example, be positioned over surplus product flume 144. This may be considered the normal position of splitter chute 61 although it may, under some circumstances, be positioned over one of the flumes 140, 142. Extending arm 186 by applying air pressure to cylinder 71 through inlet 190, moves splitter chute 61 in the counterclockwise direction, as viewed in FIGURE 7, to deposit the discharge from spout 41 into first product flume 140; retracting arm 186 by applying air to cylinder 184 through inlet 192, moves splitter chute 61 in the clockwise direction to deposit the discharge from spout 41 into second product flume 142.

FIGURE 8 shows still another means for moving splitter chute 61 and the other splitter chutes of the hydraulic classifier so as to deposit the discharge from valves 31 through 39 in the desired product flume 140 or 142, or in surplus flume 144. This means employs a pair of oppositely mounted air cylinders 194 and 196 connected together by a rack 198. The teeth of rack 198 engage a pinion 191 mounted on bracket 166 so that the movement of rack 198 moves splitter chute 61. Thus, by energizing air cylinder 194 through air pressure inlet 195, rack 198 is moved away from that air cylinder, rotating splitter chute 61 in a counterclockwise direction, as viewed in FIGURE 8, to deposit the discharge of spout 41 into first product flume 140. By moving rack 198 the other way, as by energizing air cylinder 196 through inlet 193, splitter chute 61 is moved in a clockwise direction to deposit the discharge from spout 41 into the second product flume 142. Springs 197 and 199 center rack 198 when no air pressure is applied to the cylinders.

In lieu of splitter chutes 61 through 69, discharge spouts 41 through 49 may be formed of flexible bases which are moved into vertical alignment with any one of the three product flumes. Such a construction is shown in FIGURE 12. Flexible discharge spout 41A is surrounded by an actuating ring 343 mounted on one end of lever 345. The other end of lever 45 is journalled in vane type air actuator 347 which is mounted on member 164, actuator 347 includes a wedge shaped housing 349. Lever 45 is journalled in the apex of housing 349 and is attached to vane 351 which is movable in an arcuate path from one side wall of housing 349 to the other side wall of the housing. Each side wall of housing 349 contains an air inlet, air inlet 180 being shown in FIGURE 12.

In operation, with no air being admitted to housing 349 through either of the inlets, vane 351 is centered in housing 349 by centering springs 355 and 357 and spout 41 is positioned over surplus product flume 144 so as to direct the discharge from valve 31 into that flume. If air is admitted to housing 349 through inlet 180, vane 351 is deflected toward the opposite side wall of the housing swinging lever 345, actuating ring 343, and discharge spout 41 over first product flume 140. If air is admitted to housing 349 through the other air inlet, vane 351 is deflected toward the side wall of housing 349 containing inlet 180 and lever 345, actuating ring 343, and discharge spout 41 are moved over second product flume 142.

The control means forms a part of the blending system and is operatively associated with discharge valves 31 through 39 and splitter chutes 61 through 69 to deposit the required amount of sand from each classifying station into the product flumes to produce sand products having the desired blend of various particle size sands. Before presenting a detailed description of the elements of the control means their relationship to the above described apparatus and their operation, a brief description will afford a general understanding the blending system and its principle of operation.

To commence operation of the hydraulic sand classifier, tank 16 is first flooded with a slurry of various particle size sands and water. Discharge valves 31 through 39 are closed and splitter chutes 61 through 69 are positioned over surplus product flume 144. The sand level indicators 51 through 59, located at each of the classifying stations 21 through 29 are rendered operative, as by energizing motor 117 to rotate paddle 116. As the slurry passes through tank 16, the sands contained therein settle out at the various classifying stations. The level of settled sands builds up in time, at each classifying station and begins to retard the rotation of the paddles on the respective sand level indicators, applying a torque to motors 117 and closing switch contacts 129 to provide a signal indicating a sufficient quantity of sand at that station to commence a blending operation. Each of the sand level indicators 51 through 50 provides a signal to the control means when sufficient sand has collected at given classifying stations 21 through 29.

Depending on the desired formulation of the sand product control means operates the splitter chutes through the actuating means, such as the air cylinder 71 associated with splitter chute 61, to adjust the position of the chutes at selected classifying stations so that they may deposit sand discharged from the valves at the classifying stations into the product flume. For example, if it is desired to blend a sand product from sands collected at classifying stations 21, 23, 25, 27 and 29, the control means operates the actuating means on splitter chutes 61, 63, 65 and 67 and 69 to swing these chutes over first product flume 140 so as to deposit the discharge from valves 31, 33, 35, 37 and 39 into that product flume. Splitter chutes 62, 64, 66 and 68 are retained in position over surplus product flume 144.

Upon the receipt of signals from any or all of sand level indicators 51 through 59, the control means opens the discharge valves associated with the signal-supplying sand level indicators to permit the discharge of sand therefrom. The sand from valves 31, 33, 35, 37 and 39 will be deposited in first product flume 140 by splitter chutes 61, 63, 65, 67, and 69 to form the sand product. The sand from valves 32, 34, 36, and 38 is deposited in surplus product flume 144, to be drained from the hydraulic sand classifier as surplus sand.

The amount of each of the various selected particle size sands employed in the blended sand products is regulated by the time interval during which each of the splitter chutes is positioned so as to discharge the sand from the open valves into a specific selected product flume. Thus, if twice as much sand from classifying station 21 is required as is required from classifying stations 23, 25, 27 and 29 to form the blended sand product, splitter chute 61 is positioned over first product flume 140 for twice the period of time that splitter chutes 63, 65, 67 and 69 are positioned over that flume.

When the splitter chutes are not discharging into the first product flume 140, they are positioned so as to discharge into surplus flume 144 as long as the discharge valves 31 through 37 remain open. This prevents an inordinate build up of sand at the classifying stations in tank 16. However, it also results in large quantities of sand being deposited in the surplus product flume 144 and wasted. In order to prevent this excessive discharge into the surplus product flume, a second sand product may be formulated after the completion of the blending of the first product. To accomplish this, the individual splitter chutes are adjusted by control means initially to a position over first product flume 140 to blend the first product, then to a position over second product flume 142 to blend the second product and finally to a position over surplus flume 144 to discharge the remainder of the sand into the surplus flume.

Referring now to FIGURE 9, there is shown therein a block diagram of the blending system of a hydraulic sand classifier including control means 200. Only classifying stations 21, 22, 23 and 24 of the water settling tank 16 are shown for clarity, it being understood that classifying stations 25, 26, 27, 28 and 29 are connected and operated by control means 200 in the same manner as the classifying stations shown. Control means 200 receives input singals from sand level indicators 51 through 54 and supplied output signals to air control 202 which contains solenoid actuated air valves controlling the opening and closing of the discharge valves 31 through 34 and to air control 204 which contains solenoid actuated air valves connected to actuating means, such as air cylinders 71 through 74, to adjust the splitter chutes 61 through 64 so as to deposit the discharge from the discharge vlaves into first product flume 140, second product flume 142, or surplus product flume 144 as desired. The control means is supplied with electric power from an electric power supply 206 and air controls 202 and 204 are supplied with compressed air from compressed air source 208. Air control 202 is connected to discharge valves 31 through 34 by air lines 81 through 84. Air control 204 is connected to actuators 71 through 74 for the splitter chutes by air lines 91 through 98.

Figure 10:
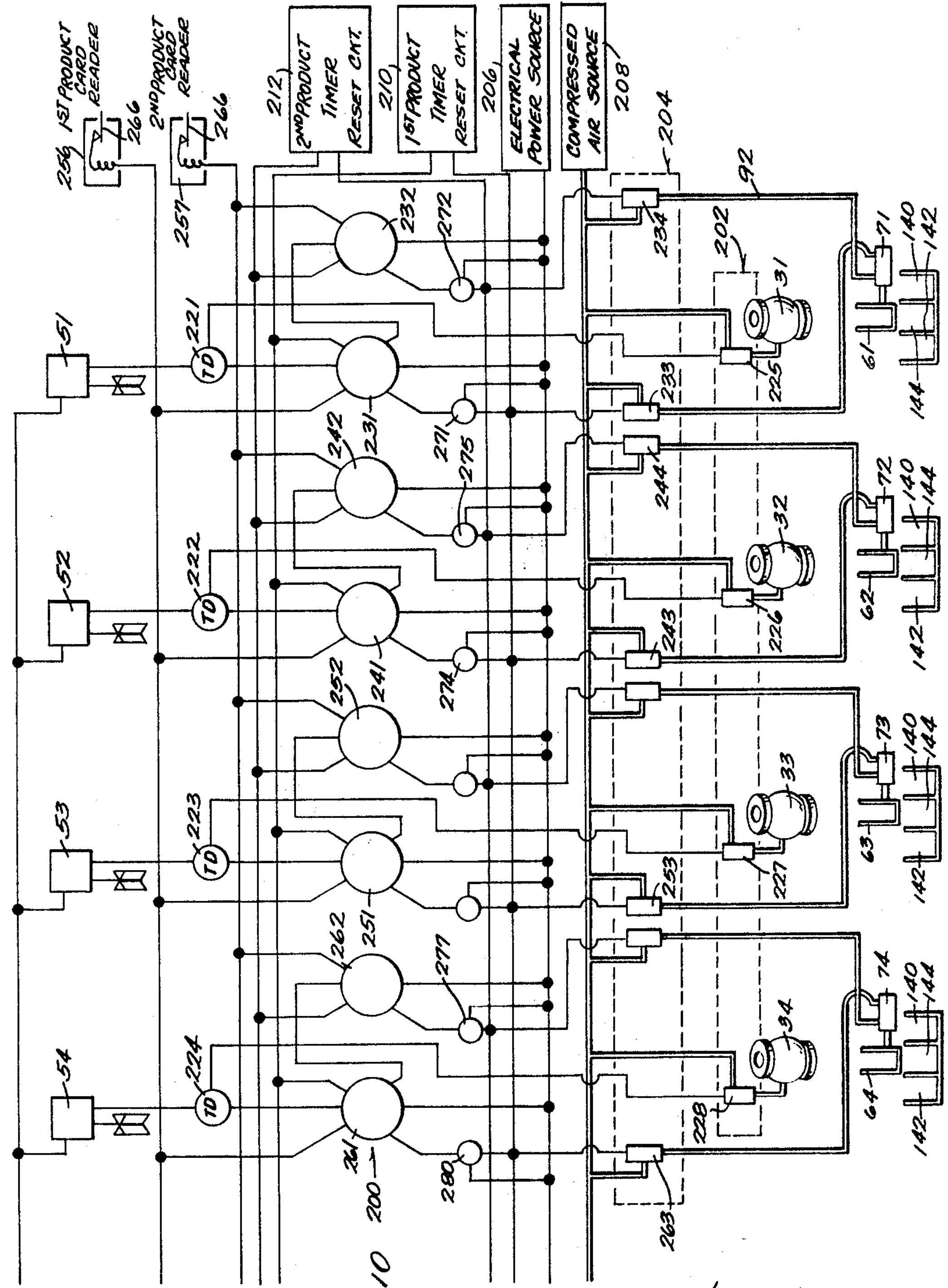
FIGURE 10 is a schematic diagram of the control means of the blending system.

FIGURE 10 is a schematic diagram of the control means 200 of the automatic blending system with the elements thereof, along with the associated settling tank 16 apparatus, shown in diagrammatic form. Sand level indicators 51 through 54 are connected to control means 200 through time delay relays 221, 222, 223 and 224. These time delay relays require that the sand level indicators provide a continuous signal indicating a sufficient amount of sand at the associated classifying station in the tank for the amount of the time delay in the relay before an output signal is generated from the relay. For example, the time delay may be two seconds. This reduces excessive chatter from the sand level indicators and adds to the stability of control operation. The output of the sand level indicators is supplied to both air control 202, having solenoid operated air valves 225, 226, 227, and 228 for opening the valves 31, 32, 33 and 34, and to the remainder of control means 200 to initiate operation of the control means to actuate the splitter chutes and deposit the discharge from the valves in the desired product flumes for the desired length of time.

Additional input signals are supplied to control means 200 to regulate its operation to deposit the correct amount of the required particle size sands in the product flumes in accordance with the formulae for the sand products being blended. These signals may be supplied to control means 200 manually, as by adjusting a plurality of switch means to provide the desired input signals, or the formulations may be placed on a punched card, magnetic tape or such device having the information encoded thereon and which is inserted in a reader to provide the necessary input signals to control means 200.

The preferred embodiment of the invention employs punched cards and hence a first product card reader 256 and a second product card reader 257 are shown connected to control means 200. One such card reader is provided for each sand product being formulated by the hydraulic sand classifier and associated blending system. The punched cards 266 may be formed of stiff plastic having the code 267 arranged in two columns, 268 and 269, for each classifying station on tank 16. See FIGURE 11. The coded indicia for classifying stations 21 through 25 are located along one edge of the card while the indicia for other stations in the tank are located on the opposite edge of the card. The indicia 267 for classifying stations 21 through 24 are shown in solid lines in FIGURE 11 to correspond with the four classification stations shown in FIGURES 9 and 10. The position of additional indicia 267 which would be employed in the control means of a nine station tank, such as is shown in FIGURE 1, are indicated in phantom.

As shown in the indicium 267 for unused classifying station 25, one column 268 thereof contains circled numbers 270 running from zero to five while the other column 269 contains circled numbers running from zero to nine. By combining one number from each of the two columns 268 and 269, any combination of numbers from zero to fifty-nine may be obtained. These numbers correspond to the desired number of seconds that the splitter chute will deposit sand from the classifying station controlled by the respective codes into the product flume for the sand product punched card 266 is formulating.

Depending upon the type of card reader used, the circled numbers 270 representing the desired number of seconds may be punched out or all of the circled numbers except those representing the desired number of seconds may be punched out. As the latter approach provides a card on which the desired number of seconds may be directly read, it is generally preferred and is shown in FIGURE 11. Thus, for classifying station 21, all circled numbers 270 except the number "2" are punched out in column 268 and all circled numbers 270 except the number "0" are punched out in column 269, thereby providing a signal to control means 200 which requires sand from classifying station 21 to be deposited in first product flume 140 for 20 seconds. In a similar manner, the card 266 shown in FIGURE 11 requires classifying station 22 to deposit sand in the product flume for 30 seconds, station 23 for 10 seconds and station 24 for 40 seconds.

Control means 200 contains a series of first product timers 231, 241, 251 and 261 and a series of second product timers 232, 242, 252, and 262. Each of the two series of timers contains one timer for each classifying station in the control. These timers may comprise any commonly used timing mechanism capable of timing up to 60 seconds, or such other maximum timing interval as is employed in the blending system, when an appropriate input signal is applied thereto. The timers must also be capable of intermittent operation so that, in the event the input signal is removed, the timing operation ceases until such time as the signal is reapplied. An electric motor driven, cam operated, switch; or an electric motor driven potentiometer; or an oil filled dash pot with small orifices; or a resistance-capacitance network may be used as the timers. By way of example, electrical timers energized by electrical power source 206 are shown in FIGURE 10.

Considering in detail the series of first product timers 231, 241, 251 and 261, the input signals to each of these timers comprise first, a signal from the associated time delay relay and secondly, a signal from first product card reader 256. In the case of timer 231, it initially receives an input signal from time delay relay 221 which permits that particular timer to operate only when time delay relay 221 indicates there is sufficient sand at classifying station 221 regardless of any other input signal received by the timer. Timer 231 also receives an input signal from first product card reader 256 corresponding to the 20 second interval which that timer 231 will control the operation of splitter chute 61 to deposit sand from classifying station 21 into first product flume 140. Timer 241 receives an input signal from time delay relay 222 and an input signal from first product card reader 256 corresponding to the 30 second interval which that timer 241 will control the operation of splitter chute 62 to deposit sand from classifying station 22 into first product flume 140. The input signals to the remaining first product timers 251 and 261 are connected in a similar manner.

Additionally, all of the first product timers 231, 241, 251 and 261 receive a third input signal from first product timer reset circuit 210 which resets the first product timers in a manner hereinafter described.

Each of the first product timers generates two output signals during its timing interval. One output signal is connected through a relay to a solenoid actuated air valve to adjust the position of the splitter chute to control the deposition of sand into the first product flume 140. Thus, first product timer 231 is connected through relay 271 to solenoid actuated air valve 233 which controls the air pressure in air line 91 to operate actuating means 71 to swing splitter chute 61 over first product flume 140. This output is also supplied to first product timer reset circuit 210. The second output from the first product timers is connected to the associated second product timer at the same classification station to prevent the second product timer from operating until the first product timer has timed out. For example, first product timer 231 provides a signal to second product timer 232 which prevents the second product timer from operating until timer 231 has timed out.

The output signals from the remaining timers in the first product series are connected in a similar manner. Thus, product timer 241 is connected through relay 274 to control solenoid actuated air valve 243 and, in turn, actuating means 72 and splitter chute 62. The other output from first product timer 241 is supplied as an input signal to second product timer 242 at classifying station 22. One output signal from first product timer 251 is connected through relay 277 to solenoid actuated air valve 253 while the other output of this timer is supplied as an input signal to second product timer 252 at classifying station 23. One output of first product timer 261 is connected through relay 280 to solenoid actuated air valve 263 while the other output of this timer is supplied to second product timer 262 at classifying station 24.

The second product timers 232, 242, 252 and 262 may be similar in construction to the first product timers. In addition to the input signals from the first product timers, each of these second product timers receives an input signal from the associated time delay relay and from the second product card reader 257. Thus, timer 232 receives a signal from time delay relay 221 which permits that timer to operate only when time delay relay 221 indicates there is sufficient sand at classifying station 21 regardless of any other input signal received by timer 232. The timer also receives an input signal from second product card reader 257 corresponding to the number of seconds timer 232 will control the operation of splitter chute 61 to deposit sand from classifying station 21 into second product flume 142. Timer 242 receives an input signal from time delay relay 222 and an input signal from second product card reader 257 corresponding to the number of seconds timer 242 will control the operation of splitter chute 62 to deposit sand from classifying station 22 into second product flume 142. The input signals to the remaining second product timers 252 and 262 are connected in a similar manner.

All of the second product timers 232, 242, 252, and 262 receive a fourth input signal from second product timer reset circuit 212 which resets the second product timers in a manner hereinafter described.

Each of the second product timers provides an output signal to an associated solenoid actuated air valve. For example, timer 232 is connected to the splitter chute 61 through relay 272 and solenoid actuated air valve 234 and actuating means 71 so as to control the operation of the chute while the second product timer is timing. This output signal is also supplied to second product timer reset circuit 212.

Second product timer 242 for sand classifying station 52 is connected in the same manner as second product timer 232. Specifically, second product timer 242 is connected through relay 275 and solenoid actuated air valve 244 to actuating means 72 to control the operation of splitter chute 62 when timer 242 is timing. The remaining product timers in the second series, that is, timer 252 and 262 are connected to the respective splitter chutes in the same manner as timers 232 and 242.

The operation of control means 200 is as follows. This operation is first described herein as producing a single blended sand product and then as producing two blended sand products.

To formulate a single sand product, a card, such as card 266 shown in FIGURE 11, is inserted in first product card reader 256 to supply input signals to the first product timers 231, 241, 251 and 261 to set the desired length of time that the splitter chutes will be positioned over the first product flume 140 so that the discharge from the classifying stations is deposited in that flume. Using the example previously employed in conjunction with the description of card 266, sand from classifying station 21 is to be deposited in product flume 140 for 20 seconds, sand from classifying station 22 for 30 seconds, sand from classifying station 23 for 10 seconds, and sand from classifying station 24 for 40 seconds. Setting the timers provides a signal to the solenoid valves 233, 243, 253, and 263, through relays 271, 274, 277 and 280 to provide sufficient pressure in air lines 91, 93, 95 and 97 to cause actuating means 71 through 74 to position splitter chutes 61 through 64 over first product flume 140.

Assuming the tank 16 is flooded and hydraulic classification of the sands has started, the motors on sand level indicators 51 through 54 are energized to start the attached paddles rotating. The sand level indicators sense the buildup of sand at the classifying stations. When the sand at any given station has built up to a sufficient level, the sand level indicator at that station provides a signal to the associated time delay relay. For example, when the sand has accumulated to a sufficient depth at the first classifying station, sand level indicator 51 sends a signal to time delay relay 221. If the signal from sand level indicator 51 remains applied to time delay relay 221 for the amount of its time delay, an output signal is provided from the relay. This signal operates air valve 225 in air control 202 to open discharge valve 31 and deposit sand from classifying station 21 into product flume 140. The same signal is also sent to timer 231 to start the timer timing.

An identical operation occurs at each classification station 22, 23 and 24 as soon as the sand level at the station builds up. It is, however, not necessary that all discharge valves be open before the blending of the sand product commences.

In accordance with the formula provided to control means 200 by card 266, splitter chute 61 is retained by timer 231 in the position to deposit sand from valve 31 in product flume 140 for 20 seconds. At the end of this time, the timer 231 times out and the output signal to air valve 233 is removed. At the same time the output signal supplied to second product timer 232 is removed. However, as that timer has no timing interval, because of the absence of a card in second product card reader 258, it times out immediately and no output signal is provided. This deenergizes actuating means 71 and causes the splitter chute 61 to return to its original position so that the remaining discharge from valve 31 is deposited in surplus product flume 144. A signal is sent to first product timer reset circuit 210 when timer 231 times out.

If at any time during the 20 second timing interval of timer 231, sand level indicator ceases to supply a control signal indicating a suffiicency of sand at classifying station 21, the output signal from time delay relay 221 is removed. This causes air valve 225 to close discharge valve 31 and timer 231 to stop timing. When a signal is again supplied to time delay relay 221 and an output signal reissues therefrom, valve 31 is reopened and timer 231 resumes its timing operation. This timing operation may be interrupted as many times as is necessary. However, regardless of the number of interruptions, timer 231 only times for a total of 20 seconds.

The operation of the other classifying stations 22, 23 and 24 is similar and may proceed simultaneously or in series therewith depending upon the availability of sufficient amounts of sand at the various classification stations. After each of the first product timers 231, 241, 251, and 261 times out, the splitter chute associated with the timer is moved from a position over first product flume 140 to a position over surplus product flume 144, so as to deposit sand therein until the respective valve closes.

The result of the above described operation is that a blended sand product is formed in first product flume 140 comprised of a 20 second deposit from classifying station 21, a 30 second deposit from classifying station 22, a 10 second sand deposit from classifying station 23, and a 40 second sand deposit from classifying station 24. The product thus formed is carried down the flume 140 and out of the spout 152 for drying and further use.

As each timer itmes out, a signal is sent to first product timer reset circuit 210. When all the first product timers 231, 241, 251 and 261 have timed out, they will all have supplied a signal to the reset circuit. Reset circuit 210, which may be an electronic or electromechanical AND gate, then provides an output signal in conducotr 214 which resets all the first product timers to repeat the above described operation of control means 200. The operation is repeated as many times as is necessary to provide the desired quantity of blended sand product.

To provide two sand products, a second card 266 is inserted in second product card reader 257 to provide signals to timers 232, 242, 252 and 262 to provide various timing intervals to these timers so as to control the operation of the splitter chutes and deposit the discharge from the discharge valves into second product flume 142 to formulate the second product. When the individual first product timers 231, 241, 251 and 261 time out, the output signal therefrom is removed from the associated second product timers 232, 242, 252, and 262 which causes those timers to start timing in accordance with a card placed in the second product card reader 257. For example, when timer 231 has timed out by depositing the discharge from valve 31 into product flume 140 for 20 seconds, its output signal is removed from timer 232 thus energizing timer 232. Timer 232, when energized, provides a signal through relay 272 to air valve 234 which energizes actuating means 71 through air line 92 to swing splitter chute 61 so that it deposits the discharge from valve 31 into product flume 142. Timer 232 retains splitter chute 61 over product flume 142 for the required length of time to provide the necessary amount of sand to the product flume. When timer 232 times out, an output signal is provided to deenergize actuating means 71 to swing splitter chute 61 back to the normal position so as to deposit the remaining sand from the discharge valve 31 into surplus product flume 144, and a signal is also sent to second product timer reset circuit 212.

The operation of timers 242, 252, 262, at the remainder of the classifying stations is the same as the operation of timer 232. That is, as the associated first product timer 241, 251, or 261 times out, timers 242, 252 and 262 are started and the splitter chutes 62, 63 and 64 are swung so that they discharge the contents into second product flume 142. When the second product timers 232, 242, 252, and 262 time out, completing the formulation of the second sand product, the splitter chutes 61 through 64 are swung so as to deposit the remaining sand from the discharge valves into surplus product flume 144. After all of the second product timers have timed out, they are reset by second product timer reset circuit 212.

Due to the fact that the splitter chutes deposit sand into the first product flume 140 for varying amounts of time, normal operation of the control means 200 contemplates that shortly after the blending system is started, certain splitter chutes will still be depositing sand into that product flume while others have started to deposit sand into second product flume 142 or will be depositing sand into surplus product flume 144.

However, when all the first product timers 231, 241, 251 and 261 time out and are reset by reset circuit 210, the timing of the second product timers 232, 242, 252, and 262 is interrupted and the formulation of the first sand product begins again. First product timers 231, 241, 251 and 261 start timing again and splitter chutes 61 through 64 are swung by actuating means 71 through 74 back over first product flume 140 to deposit the discharge from the valves into that flume. The timing initiated on the second product timers 232, 242, 252, and 262 is retained on these timers in the same manner as during interruptions caused by the lack of sand at the classifying stations.

When the first product timer associated with each of the second product timers again times out, the second product timers continue their timing operation until they time out and are reset to repeat their timing cycle. In this manner the formulation of the first product is given precedence over the formulation of the second product so that the largest quantity of the first sand product commensurate with the available amounts of required sands in the hydraulic sand classifier is prepared. Lesser amounts of the second sand product are then formulated, as permitted, to prevent excessive discharge of sand into the surplus product flume as so often occurs in heretofore available types of hydraulic sand classifiers.

Various modes of carrying out the invention are contemplated as being within the scope of the following claims particularly pointing out and distinctly claiming the subject matter that is regarded as the invention:

I claim:

1. In a hydraulic sand classifier having a plurality of sand classifying stations, each with a single valve for discharging classified sand, level sensing means connected to said valves for opening each of said valves when a predetermined amount of sand has accumulated at the respective classifying stations, and distributing means operatively associated with each of said valves and adjustable among a plurality of product flumes for depositing classified sand from the stations into said flumes, a control system for formulating a plurality of sand products from the classified sand discharged from the classifier comprising:

first resettable timing means coupled to the distributing means for selecting the amount of sand from each station to be included in a first sand product by regulating the time intervals during which said distributing means deposits sand from the respective classifying stations into a first sand product flume;

first reset means connected to said first resettable timing means for resetting said timing means at the completion of the timing intervals of the timing means to deposit sand from said stations into said first sand product flume for additional time intervals;

second resettable timing means coupled to the distributing means for selecting the amount of said sand from each station to be included in a second sand product by regulating the time intervals during which said distributing means deposits sand from the respective classifying stations into a second product flume;

second reset means connected to said second resettable timing means for resetting said timing means at the completion of the timing intervals of the timing means to deposit sand from said stations into said second product flume for additional time intervals, said first and second timing means being interconnected so as to initiate the timing intervals of said second timing means at the completion of the timing intervals of the first timing means and for interrupting the timing intervals of said second timing means upon the resetting and repetition of the timing intervals of said first timing means, whereby said control system formulates a plurality of sand products in seriatim with preference being given to the formulation of the first sand product.

2. The control system of claim 1 wherein said first timing means includes a plurality of first timers, one timer being coupled to the distributing means at each classifying station for regulating the time interval during which the distributing means deposits sand from the respective classifying station into the first product flume, and wherein said second timing means includes a plurality of second timers, one timer being coupled to the distributing means at each classifying station for regulating the time interval during which the distributing means deposits sand from the respective classifying stations into the second product flume, said timers of said first timing means being connected to said first reset means for resetting said timers at the completion of the timing intervals of the first timers, said timers of said second timing means connected to said sesond reset means for resetting said timers at the completion of the timing intervals of the second timers, the first timer at any given classifying station being connected to the second timer at the same classifying station for initiating the timing interval of the second timer at the completion of the timing interval of the first timer and for interrupting the timing interval of the second timer upon the resetting, and repetition of the timing interval, of the first timer.

3. The control system of claim 1 suitable for use in a hydraulic sand classifier in which the distributing means comprises splitter chutes operatively associated with each of said valves and adjustable among the plurality of product flumes, wherein said control system includes pneumatic actuating means for actuating said splitter chutes interposed between the timing means and the splitter chutes.

4. The control system of claim 3 wherein said pneumatic actuating means comprises pneumatic cylinder means containing rack members which engage pinions mounted on the splitter chutes.

5. The control system of claim 1 suitable for use in a hydraulic sand classifier in which the distributing means comprises flexible discharge spouts mounted on said valves and adjustable among the plurality of product flumes, wherein said control system includes pneumatic actuating means interposed between said timing means and said flexible discharge spouts for deflecting said discharge spouts to deposit sand into said flumes.

6. The control system of claim 3 wherein said pneumatic actuating means comprises a vane type air actuator.

7. The control system of claim 5 wherein said pneumatic actuating means comprises a vane type actuator.

References Cited

UNITED STATES PATENTS

| | | | |
|---|---|---|---|
| 2,923,438 | 2/1960 | Logan et al. | 222—132 X |
| 2,982,445 | 5/1961 | Koble | 222—132 X |
| 3,160,321 | 12/1964 | Cochran | 222—64 |
| 3,114,479 | 12/1963 | Keeney | 222—132 X |

ROBERT B. REEVES, Primary Examiner

H. S. LANE, Assistant Examiner

U.S. Cl. X.R.

222—132, 144.5, 145